United States Patent
Nelson

[11] 3,709,413
[45] Jan. 9, 1973

[54] CAR TRUNK RACK
[76] Inventor: Ralph R. Nelson, 436 Lingle Avenue, Lafayette, Ind. 47901
[22] Filed: March 4, 1971
[21] Appl. No.: 120,939

[52] U.S. Cl. ............................224/42.1 H, 224/29 R
[51] Int. Cl. ..............................................B60r 9/08
[58] Field of Search ........224/42.1 R, 42.1 E, 42.1 F, 224/42.1 G, 42.1 H, 42.1 CA, 42.11, 29 R, 42.45 R; 214/450

[56] References Cited

UNITED STATES PATENTS

| | | | |
|---|---|---|---|
| 3,170,583 | 2/1965 | Meyer | 224/42.1 E X |
| 1,681,936 | 8/1928 | Hillstrom | 224/42.1 H |
| 3,321,095 | 5/1967 | Groll | 214/450 |

Primary Examiner—Gerald M. Forlenza
Assistant Examiner—Jerold M. Forsberg
Attorney—Trask, Jenkins & Hanley

[57] ABSTRACT

Apparatus for carrying long articles, such as a boat or ladder, on an automobile. An A-frame trestle is mounted on the rear deck with its feet in the rain gutter grooves at the sides of the trunk opening in the deck, to form a rear support, and a crossbar is mounted by suction cups or other conventional means on the car roof to provide a front support. The two supports may be connected by a lengthwise bar.

16 Claims, 6 Drawing Figures

PATENTED JAN 9 1973 3,709,413
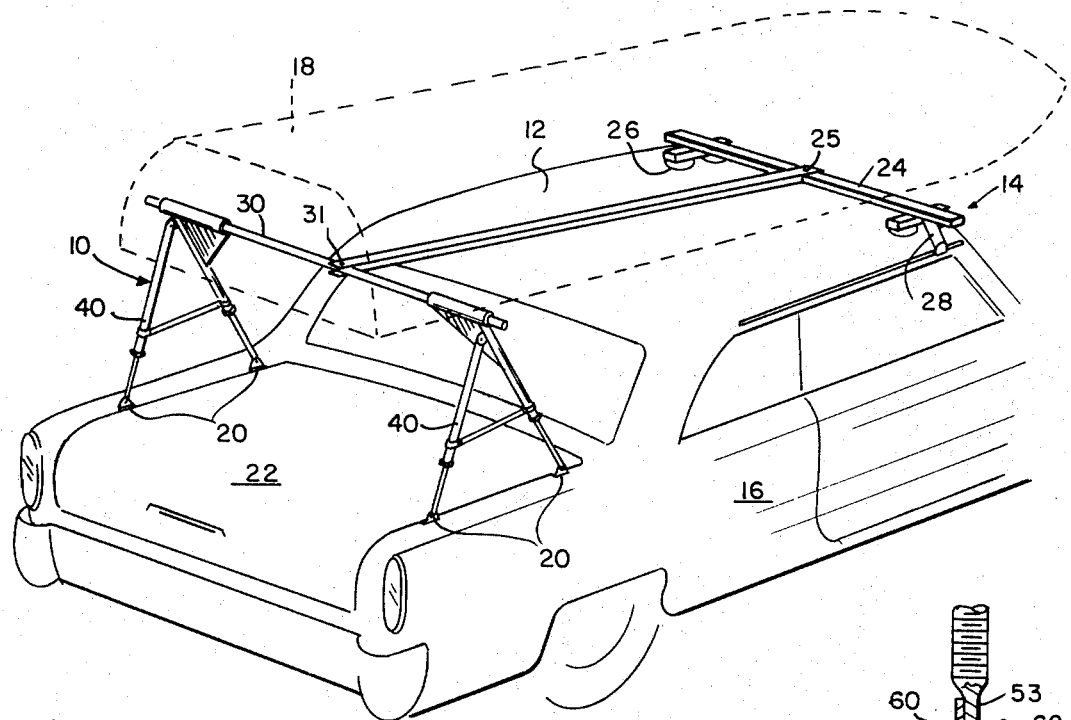
Fig.1
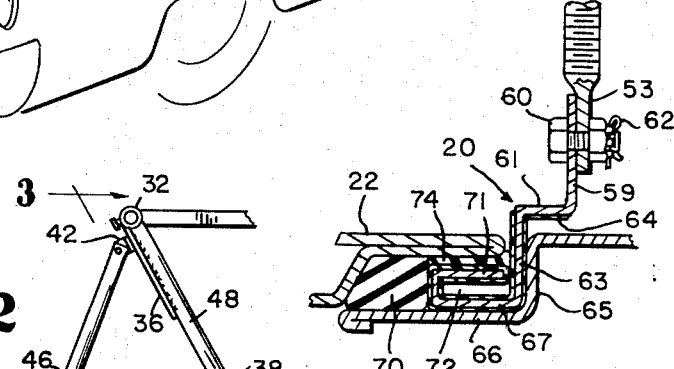
Fig.4
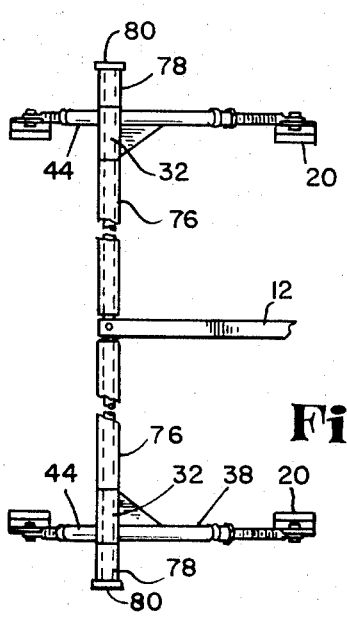
Fig.5
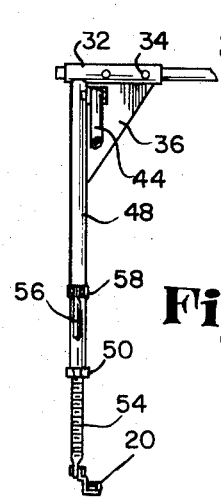
Fig.2
Fig.3
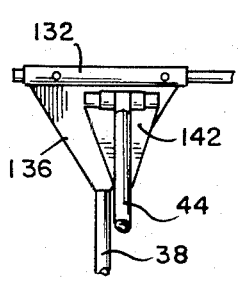
Fig.6
INVENTOR
RALPH R. NELSON
BY
Trask, Jenkins & Hanley
ATTORNEYS

CAR TRUNK RACK

BACKGROUND OF THE INVENTION

Under a number of circumstances, it is desirable or necessary for boating enthusiasts to carry their boats on top of their cars. The conventional roof supported rack is usually too short to support a lengthy article such as a boat. Various special racks for carrying boats have been proposed. These are frequently laborious to set up and use, and bulky to store. Some have used the rear bumper of the automobile for their rear support, but these reduce the accessibility to the rear luggage compartment or trunk, especially when the car is connected for pulling a trailer. A further disadvantage of the bumper mounting itself is that bumpers vary greatly in size and style from car to car and from year to year, so that it is impractical to provide any universal mounting attachment which will fit all or a large number of bumpers with adequate security.

It is the object of the present invention to provide a rack for supporting boats and other long objects on an automobile, which is light in weight yet sturdy enough to support a boat, which is adapted to fit on many different automobiles and is easy to install and remove, which facilitates loading and unloading a boat, which gives substantially full access to the rear trunk of the car when installed, and which is readily stored when not in use.

SUMMARY OF THE INVENTION

This invention relates to a rack which is especially adapted for carrying large articles such as boats or ladders upon an automobile. The rack comprises a rear crossbar supported on the rear deck of a car body, above the trunk lid, by one or more legs at each end of the crossbar, mounted on feet seated in the rain gutters at the sides of the trunk opening. The feet are shaped to fit in the gutters beneath the edges of the trunk lid and are offset outward therefrom to support the legs in a position to clear the trunk lid. Desirably the leg supports at each end of the crossbar, are supported on two spaced feet and are in the form of A-frames or other structure which braces the crossbar against movement forward and rearward of the automobile. Also, the legs are braced to the crossbar by gussets or the like to oppose side sway. The feet are held in place by pads of sponge rubber or other yieldable material fixed to the feet and engaged under the edges of the trunk lid when closed. The pads may be varied in thickness to fit different car bodies, and permit the same feet and rack to be mounted on many different cars. Closing the lid holds the rack securely in place, and the location of the feet in the rain gutters takes advantage of the reinforced construction of the rear deck of the car at the edges of the trunk opening. Each A-frame desirably comprises two adjustable legs, pivoted or hinged together at the top, and provided with tubular or other brackets for supporting the rear crossbar.

The rack may also include a front crossbar mounted on the roof of the car in a conventional manner, as by suction cups. The front and rear crossbars may be interconnected by one or more longitudinal bars which may form a load platform. The interconnecting bar or bars also serve to reinforce the rack structure and facilitates loading, especially for supporting the front end of a boat as it is moved forward over the rear crossbar to a fully loaded position.

BRIEF DESCRIPTION OF THE DRAWING

The accompanying drawing illustrates the invention, and by way of example, shows a preferred embodiment of the invention. In such drawing:

FIG. 1 shows a car rack embodying the invention suitably mounted on a car;

FIG. 2 shows a side elevation of the rear portion of the rack of FIG. 1;

FIG. 3 is a sectional view taken on the line 3—3 of FIG. 2;

FIG. 4 is a cross section of a rack foot mounted in a rain gutter;

FIG. 5 is a plan view of a modified form of rear rack portion in accordance with the invention; and FIG. 6 is a partial view similar to FIG. 3 but showing a modification of the A-frame structure.

DETAILED DESCRIPTION OF THE PREFERRED EMBODIMENT

The car rack shown in FIG. 1 comprises a rear portion 10, a longitudinal bar 12, and a forward portion 14. The rack is shown mounted in a typical manner on a car 16, for supporting a boat 18 shown in dotted lines. The rear portion 10 of the rack is in the form of a trestle having a transverse bar 30 supported by A-frames at its ends carried on feet 20 mounted in the rain gutters at and beneath the edges of the automobile trunk lid 22. The forward portion of the rack 14 comprises a transverse bar 24 held securely to the car top by conventional means such as suction cups 26 and straps 28. The longitudinal bar 12 is connected to the transverse bars 24 and 30, preferably at their mid-points, by bolts 25 and 31. The two transverse bars 24 and 30 are the main load-bearing members of the structure, while the longitudinal bar 12 stabilizes the structure and facilitates loading. For example, in loading a boat, the bar 12 supports the forward portion of the boat away from the roof as the boat is moved forward over the rear transverse bar 30.

The rear portion 10 of the rack includes the transverse bar 30, supported at each end by an A-frame 40. The A-frame comprises a front leg 38 and a rear leg 44 pivotally interconnected at the top, and each adjustable in length. The front leg 38 consists of an upper tubular part 48 which has a nut 50 welded at its lower end, into which a threaded lower part 54 is screwed for adjustment. The upper end of the leg 38 carries a transverse tubular support 32, welded to the upper portion 48 of the leg and reinforced with a gusset 36 welded to both parts. The gusset 36 serves as a mounting plate for a pivot bracket 42 to which the rear leg 44 is pivotally connected. The rear leg 44 consists of an upper tubular portion 46 having a nut welded at its lower end into which a threaded rod 52 is screwed. The two legs may be held in fixed angular relation by a cross support 56 received at its ends in clamps 58 clamped to the upper portions 46 and 48 of the two legs and adjustable therealong to vary the angular spacing between the legs.

The tubular supports 32 at the upper ends of the A-frames 40 receive the ends of the crossbar 30, and are secured thereto by set screws 34.

The lower end of each leg is supported on a foot 20, shown in section in FIG. 4. Each foot consists of an upper vertical portion 59 which is connected to a flattened lower portion 53 of the lower section 52, 54 of the leg, as by a bolt 60 having a nut held tight by a cotter pin 62. The lower edge of the vertical portion 59 of the foot 20 is jointed to an offset portion 61, which leads to a second vertical portion 63 extending downward into the rain gutter 66 between its outer wall 65 and the edge of the trunk lid 22. Within the rain gutter, the vertical portion 63 is connected to a bottom portion 67 which rests on the bottom of the rain gutter between the side wall 65 and the gasket 70 commonly employed in such rain gutters. The bottom portion 67 of the foot is desirably formed as a return bend to provide an upper wall 71 spaced from the bottom wall and defining between them an open passage 72 which will permit the flow of water in the gutter and thus not interfere with the main water-conveying purpose of the gutter. The bottom portion 67 is held in place in the gutter by a pressure pad 74 disposed between the upper wall 71 and the projecting edge portion of the trunk lid 22. The thickness of the pressure pads 74 may be selected to suit the depth of the gutter in which the foot 20 is mounted so that when the trunk lid 22 is closed, the foot 20 is securely held in the rain gutter in the position shown in FIG. 4. To prevent marring the finish of the sheet metal, the entire lower part of the foot 20 is desirably coated with a thick coating 64 of rubber or plastic material.

In applying the rack to a particular car, the legs of the two A-frames 40 are adjusted in length to suit the configuration of the car and to support the crossbar 30 in a suitable position above the level of the roof, and the cross supports 56 between the legs are adjusted to spread their feet 20 a suitable distance to fit the rain gutters at the sides of the car trunk lid 22. Desirably, and as shown, the front leg 38 may be made somewhat longer than the rear leg 44 so that the tubular supports 32 are displaced rearward from the mid-point between the feet 20. Either before or after such adjustment, the tubular supports are slipped over the ends of the crossbar 30, and with the trunk lid 22 partially raised, the feet are set in the rain gutters in selected supporting positions. When the adjustments are complete, the set screws 34 are tightened to secure the A-frames to the crossbar 30, and the trunk lid 22 is closed to lock the feet in place in the rain gutters.

The front rack portion 14 is suitably mounted on the front portion of the car roof, resting on the suction cups 26 and secured in place by the straps 28. The longitudinal bar 12 is bolted to the mid-points of the two crossbars 24 and 30. The rack is then ready for use.

For mounting a boat 18 on the rack, one end of the boat, conveniently the front end is leaned against the rear cross bar 30, and the other end of the boat is then lifted, and the boat pushed forward to its loaded position as shown in dotted lines in FIG. 1. During such loading, the crossbars 30 and 24 are rigidly fixed in position so that the boat can be moved on them by simply pushing the boat in the right direction. Also during such loading, the longitudinal bar 12 serves to prevent the front end of the boat from falling against the top of the car, and supports such front end as the boat is pushed forward across the front crossbar 24.

To facilitate the movement of the boat over the rear crossbar 30, the modification shown in FIG. 5 may be used. Here, rolls 76 have been placed over the transverse bar 30 along its length between the tubular supports 32 and the mid-point of the bar where it is connected to the longitudinal bar 12. In addition, the length of the crossbar 30 is extended beyond the tubular supports 32 and provided with outer rolls 78 loosely received on its ends, and held in place by collars 80. During the loading of a boat on this modified structure shown in FIG. 5, the rolls 76 and 78 rotate about the bar 30 to facilitate movement of the boat lengthwise of the rack.

A modified A-frame construction is shown in FIG. 6. In this structure, the upper end of the front leg 38 is connected to a tubular cross member 132 somewhat longer than the tubular support 32 of FIG. 3, and extending in both directions from the leg 38. The leg and tubular member 32 are reinforced with a wide gusset 136, and this serves as a mounting plate for one leg of a heavy hinge 142, the other leg of which is welded to the upper end of the rear leg 44 of the A-frame. The use of the hinge stiffens the connection between the rear leg 44 and the tubular support 132 and increases the rigidity of the rack to reduce side sway.

Various alternatives may be used in place of the particular structure shown. For example, the upper and lower portions of the legs 38 and 44 may be slidably engaged, and held in lengthwise adjustment by means of cross pins received in selected transverse holes through the two parts of each leg. The leg sections need not be of circular cross section, but may be of any suitable configuration, and may be made as extruded or otherwise fabricated parts.

In use, the rear rack portion 10 forms a substantially rigid structure which holds the rear crossbar 30 firmly against movement either sidewise or lengthwise of the car. Each A-frame, having its two feet held in the gutter at spaced points, braces the crossbar against movement lengthwise of the car, and the gussets 36 between the legs and the long bar supports 32 brace the crossbar against side sway.

I claim:

1. An automobile rack, comprising:
   front and rear crossbars;
   means for fixedly supporting the front crossbar on the roof of the automobile; and
   means for supporting said rear crossbar from the rear deck of the automobile including a pair of A-frames, each of said A-frames having angularly disposed legs with feet at the lower ends thereof, for mounting in spaced relation in the gutter at the edge of one side of the truck opening in the rear deck, each of said feet having a mounting portion arranged to be received and supported in the gutter, and a rigid connecting portion joined to the mounting portion in position to extend upwardly and outwardly from the gutter past the edge of the trunk lid, and means to connect the feet to the legs of said A-frame outwardly of the edge of the trunk lid.

2. An automobile rack as claimed in claim 1 with the addition of a longitudinal member for interconnecting the front and rear cross bars.

3. An automobile rack as claimed in claim 1 in which said mounting portions of the feet are formed to provide open slots to permit the flow of water in the gutter.

4. An automobile rack as claimed in claim 1 in which at least one leg of each A-frame is adjustable in length.

5. An automobile rack as claimed in claim 1 in which the legs of each A-frame are pivotally interconnected and include upper and lower portions which are adjustable with respect to each other to adjust the length of the legs.

6. An automobile rack as claimed in claim 1 wherein the end supports for the rear crossbar include bar-supports at their upper ends, removably connected to the crossbar.

7. An automobile rack as in claim 6 wherein said bar supports are fixed to one leg of each A-frame to form a sub-assembly, and the other leg is pivotally attached to said sub-assembly.

8. An automobile rack as in claim 7 in which each bar support engages the crossbar at spaced points to prevent angular movement therebetween, and the bar supports are braced by gussets or the like to at least one of the A-frame legs to prevent angular movement therebetween and thereby prevent side sway of the rack.

9. An automobile rack for carrying a load thereon, comprising:
   a front cross bar including means to fixedly support said front
   crossbar on the roof of the automobile;
   a rear crossbar, said front and rear crossbars being for supporting a load; said rear crossbar having means rotatably mounted thereon for aiding in loading of the load;
   first and second frame means for supporting said rear crossbar, each of said first and second frame means comprising a pair of legs hingedly connected to one another and an adjustable strut interconnecting said legs,
   foot members attached to said frame means for mounting the same in the gutter at the edge of the automobile trunk,
   said foot members being arranged to be engaged by the automobile trunk lid when the same is closed and thereby held in fixed position.

10. An automobile rack as claimed in claim 9, including means for adjusting the height of said first and second frame means, said foot members being pivotally attached to the legs.

11. An automobile rack as claimed in claim 9 in which said frame means include bar supports removably connected to said rear cross member.

12. A rack adapted to be mounted on the rear deck of an automobile having a trunk opening in the deck with rain gutters at the sides of the opening, comprising a crossbar and means for supporting the same above the rear deck of the automobile, said supporting means comprising a pair of feet adapted to be mounted in spaced relation in the rain gutter at each side of the trunk opening, each foot having a mounting portion to rest in the gutter and a connecting portion joined to the mounting portion in position to extend upward from the gutter past the edge of the trunk lid, said mounting portion being formed to provide open slots to permit the flow of water in the gutter and a support structure at each end of the crossbar for supporting the same above the rear deck and against movement relative to the spaced feet lengthwise of the automobile, each supporting structure being connected to a pair of spaced feet in position to be disposed in an outwardly offset position to clear opening movement of the trunk lid.

13. A rack as set forth in claim 12 in which each support structure comprises an A-frame having a pair of angularly related legs connected to said feet.

14. A rack as set forth in claim 12 with the addition of gussets or like bracing means connected to each support structure and arranged so as to brace the crossbar thereto to oppose side sway of the rack.

15. A rack as set forth in claim 12 in which each support structure carries a mounting bracket to which the crossbar is removably mounted.

16. An automobile rack, comprising:
   front and rear crossbars,
   means for supporting the front crossbar on the roof of the automobile,
   means for supporting said rear crossbar from the rear deck of the automobile, including at least one supporting leg at each end of the crossbar, and a foot on said leg having a mounting portion arranged to be received and supported in the gutter at the edge of the trunk opening in the rear deck, in which said mounting portions of the feet being formed to provide open slots to permit the flow of water in the gutter and a connecting portion joined to the mounting portion in position to extend upward from the gutter past the edge of the trunk lid, and means to connect the leg to the foot outwardly of said edge.

* * * * *